United States Patent
Sugawara et al.

(10) Patent No.: US 9,586,616 B2
(45) Date of Patent: Mar. 7, 2017

(54) ELECTRIC POWER STEERING DEVICE (71) Applicant: NSK Ltd., Shinagawa-ku, Tokyo (JP)

(72) Inventors: Takayoshi Sugawara, Tokyo (JP);
Yousuke Imamura, Maebashi (JP);
Masahiro Maeda, Maebashi (JP)

(73) Assignee: NSK Ltd., Tokyo (JP)

(*) Notice: Subject to any disclaimer, the term of this patent is extended or adjusted under 35 U.S.C. 154(b) by 0 days.

(21) Appl. No.: 15/100,357

(22) PCT Filed: Feb. 23, 2015

(86) PCT No.: PCT/JP2015/000870
§ 371 (c)(1),
(2) Date: May 31, 2016

(87) PCT Pub. No.: WO2015/145962
PCT Pub. Date: Oct. 1, 2015

(65) Prior Publication Data
US 2016/0304119 A1    Oct. 20, 2016

(30) Foreign Application Priority Data

Mar. 25, 2014    (JP) .................................. 2014-062552

(51) Int. Cl.
*B62D 5/04*        (2006.01)
*B62D 5/00*        (2006.01)
(Continued)

(52) U.S. Cl.
CPC ........... *B62D 5/0463* (2013.01); *B62D 5/008* (2013.01); *H02P 21/05* (2013.01); *H02P 29/50* (2016.02)

(58) Field of Classification Search
CPC .... B62D 5/008; B62D 5/0463; B62D 5/0472; H02P 21/05; H02P 29/50
See application file for complete search history.

(56) References Cited

U.S. PATENT DOCUMENTS 5,343,393 A * 8/1994 Hirano .................. B62D 5/092
180/413
5,473,231 A * 12/1995 McLaughlin ............ B62D 6/10
180/446

(Continued)

FOREIGN PATENT DOCUMENTS

JP    2002-362394 A    12/2002
JP    2008-87727 A    4/2008
JP    2012-116291 A    6/2012

OTHER PUBLICATIONS

International Preliminary Report on Patentability (PCT/IPEA/409) dated Dec. 25, 2015 with English translation (6 pages).

(Continued)

*Primary Examiner* — Joseph Rocca
*Assistant Examiner* — Maurice Williams
(74) *Attorney, Agent, or Firm* — Crowell & Moring LLP (57) ABSTRACT

An electric power steering device includes a torque detector including an input shaft rotational angle detector and an output shaft rotational angle detector configured to respectively detect rotational angles of an input shaft and an output shaft coupled by a torsion bar arranged in a steering system of a vehicle; an electric motor configured to be controlled based on a torque detection value detected by the torque detector, and to generate a steering assistance force to be exerted on the output shaft; a motor rotational angle detector configured to detect a motor rotational angle of the electric motor; and a noise suppression unit configured to reduce a noise in a signal of the rotational angle of the output shaft detected by the output shaft rotational angle detector, by using the motor rotational angle detected by the motor rotational angle detector.

8 Claims, 8 Drawing Sheets

(51) Int. Cl.
*H02P 21/05* (2006.01)
*H02P 29/50* (2016.01)

(56) References Cited

U.S. PATENT DOCUMENTS

| | | | | |
|---|---|---|---|---|
| 6,152,254 | A * | 11/2000 | Phillips | B62D 5/0463 180/421 |
| 6,370,459 | B1 * | 4/2002 | Phillips | B62D 5/0436 180/443 |
| 7,188,701 | B2 * | 3/2007 | Patankar | B62D 5/0472 180/446 |
| 2007/0198153 | A1 * | 8/2007 | Oya | B62D 5/0463 701/41 |
| 2009/0143938 | A1 * | 6/2009 | Nishimura | B62D 5/0472 701/41 |
| 2009/0294208 | A1 * | 12/2009 | Nishimura | B62D 5/0463 180/446 |
| 2010/0181140 | A1 * | 7/2010 | Tomita | B62D 5/046 180/446 |
| 2010/0286870 | A1 * | 11/2010 | Endo | H02P 6/10 701/41 |
| 2010/0324785 | A1 * | 12/2010 | Kurishige | B62D 5/046 701/42 |
| 2012/0143399 | A1 * | 6/2012 | Noumura | B60W 30/02 701/1 |

OTHER PUBLICATIONS

International Search Report (PCT/ISA/210) issued in PCT Application No. PCT/JP2015/000870 dated May 26, 2015, with English translation (two (2) pages).

* cited by examiner

ELECTRIC POWER STEERING DEVICE

TECHNICAL FIELD

The present invention relates to an electric power steering device configured to exert a steering assistance force generated by an electric motor to a steering system of a vehicle, and in particular, to an electric power steering device including a torque detector configured to detect a rotational angle difference between an input shaft and an output shaft, which are coupled by a torsion bar.

BACKGROUND ART

In the electric power steering device, which is the steering device of a vehicle, to exert the steering assistance force by a rotational force of the electric motor, the steering assistance force generated by the electric motor is exerted to a steering shaft and the like of the steering system via a reduction gear.

Conventionally, since noises are included in a steering torque signal detected by a steering torque sensor, the electric power steering device has to include a noise removal means for removing the noises.

For this reason, as the noise removal means in the conventional electric power steering device, for example, a smooth filter is appropriately provided for smoothing quantization errors generated at the time of AD conversion of converting various analog signals in the electric power steering device, so as to smooth the quantization errors and suppress torque ripples caused by the quantization errors (for example, see Patent Literature 1).

CITATION LIST

Patent Literature

PLT 1: JP 2008-87727 A

SUMMARY

Technical Problem

In the conventional example disclosed in the above PLT 1, however, the smooth filter is provided for suppressing the torque ripple caused by the quantization error. However, on-off switching of the smooth filter is needed in accordance with the various situations in order to compensate a phase delay in the digital filter process, and besides, there is a drawback that the suppression effect of the torque ripple cannot be obtained when the smooth filter is off.

Thus, the present invention has been made in view of the above-described drawback, and has an object to provide an electric power steering device capable of reducing noises of the steering torque signal regardless of various situations.

Solution to Problem

In order to achieve the above object, in one embodiment of the present invention, there is provided an electric power steering device including: a torque detector comprising an input shaft rotational angle detector and an output shaft rotational angle detector configured to individually detect rotational angles of an input shaft and an output shaft coupled by a torsion bar arranged in a steering system of a vehicle; an electric motor configured to be controlled based on a torque detection value detected by the torque detector, and to generate a steering assistance force to be exerted on the output shaft; a motor rotational angle detector configured to detect a motor rotational angle of the electric motor; and a noise suppression unit configured to reduce a noise in a signal of the rotational angle of the output shaft detected by the output shaft rotational angle detector, by using the motor rotational angle detected by the motor rotational angle detector. The noise suppression unit includes: a first filter configured to carry out a filter process on the signal of the rotational angle of the output shaft detected by the output shaft rotational angle detector such that a transmission gain in a high frequency is relatively smaller than a transmission gain in a low frequency; and a second filter configured to carry out an angular acceleration operation process of the electric motor detected by the motor rotational angle detector.

In such a configuration, the noise suppression unit reduces noises in the output shat rotational angle detected by the output shaft rotational angle detector, by using the motor rotational angle detected by the motor rotational angle detector. This configuration eliminates the need to switch between on and off, and efficiently reduces noises in various situations. A smooth steering feel without a change is obtainable at a low cost.

In addition, in such a configuration, if the low-pass filter process is carried out, for example, on the signal of the rotational angle of the output shaft detected by the output shat rotational angle detector, for example, and the angle signal in a high-frequency region is attenuated, the angular acceleration of the motor is added to the motor rotational angle detected by the motor rotational angle detector so that the attenuation of the angle signal in the high-frequency region can be compensated.

Further, in the above-described electric power steering device, the noise suppression unit may be configured to add a first filter output from the first filter to a second filter output from the second filter to calculate a noise reduced output shaft rotational angle signal, and the torque detector may be configured to multiply a torsion bar rate by a value obtained by reducing the noise reduced output shaft rotational angle signal from a signal of the rotational angle of the input shaft detected by the input shaft rotational angle detector, to calculate steering torque.

In such a configuration, the noise suppression unit may be configured to add a first filter output from the first filter to a second filter output from the second filter to calculate a noise reduced output shaft rotational angle signal. Then, a rotational angle difference generated by twisting of the torsion bar can be calculated by reducing the noise reduced output shaft rotational angle signal from the signal of the rotational angle of the input shaft detected by the input shaft rotational angle detector. The steering torque can be calculated by multiplying the torsion bar rate by the rotational angle difference.

Further, in the above-described electric power steering device, the first filter may be made of either one of a low-pass filter or a filter having a signal smooth characteristic.

In such a configuration, since the first filter is made of either one of a low-pass filter or a filter having a signal smooth characteristic, the output shaft rotational angle signal in which the high-frequency noise is suppressed is available.

Further, in the above-described electric power steering device, the second filter may be made of at least one of a high-pass filter or a filter having a high-frequency emphasis characteristic.

In such a configuration, since the second filter is made of at least one of a high-pass filter or a filter having a high-frequency emphasis characteristic, when the output shaft rotational angle in high frequency is attenuated, such an attenuated amount can be compensated by the filter output of the motor rotational angle.

Further, in the above-described electric power steering device, the filter having the signal smooth characteristic and the filter having the high-frequency emphasis characteristic may be set to be paired characteristics.

In such a configuration, since the filter having the signal smooth characteristic and the filter having the high-frequency emphasis characteristic are set to be paired frequency characteristics, the output shaft rotational angle in which noises are suppressed smoothly is available with a lower side and a higher side correctly separated.

Further, in the above-described electric power steering device, the electric motor may be coupled with the output shaft via a reduction gear mechanism.

In such a configuration, the motor rotational angle of the electric motor and the output shaft rotational angle of the output shaft have a correlation. Since the output of the filter process carried out on the motor rotational angle is added to the output of the filter process carried out on the output shaft rotational angle, when the output shaft rotational angle in the high-frequency region is attenuated, such an attenuated high-frequency region can be compensated correctly.

Advantageous Effects

In one embodiment of the present invention, it is possible to provide an electric power steering device capable of reducing noises of the steering torque signal regardless of various situations.

DESCRIPTION OF EMBODIMENTS

In the following detailed description, lots of specific details will be given to facilitate the complete understanding of embodiments of the present invention. However, it would be apparent that one or more embodiments can be carried out without the specific details. In addition, known structures and devices are schematically illustrated for brief drawings.

Figure 1:
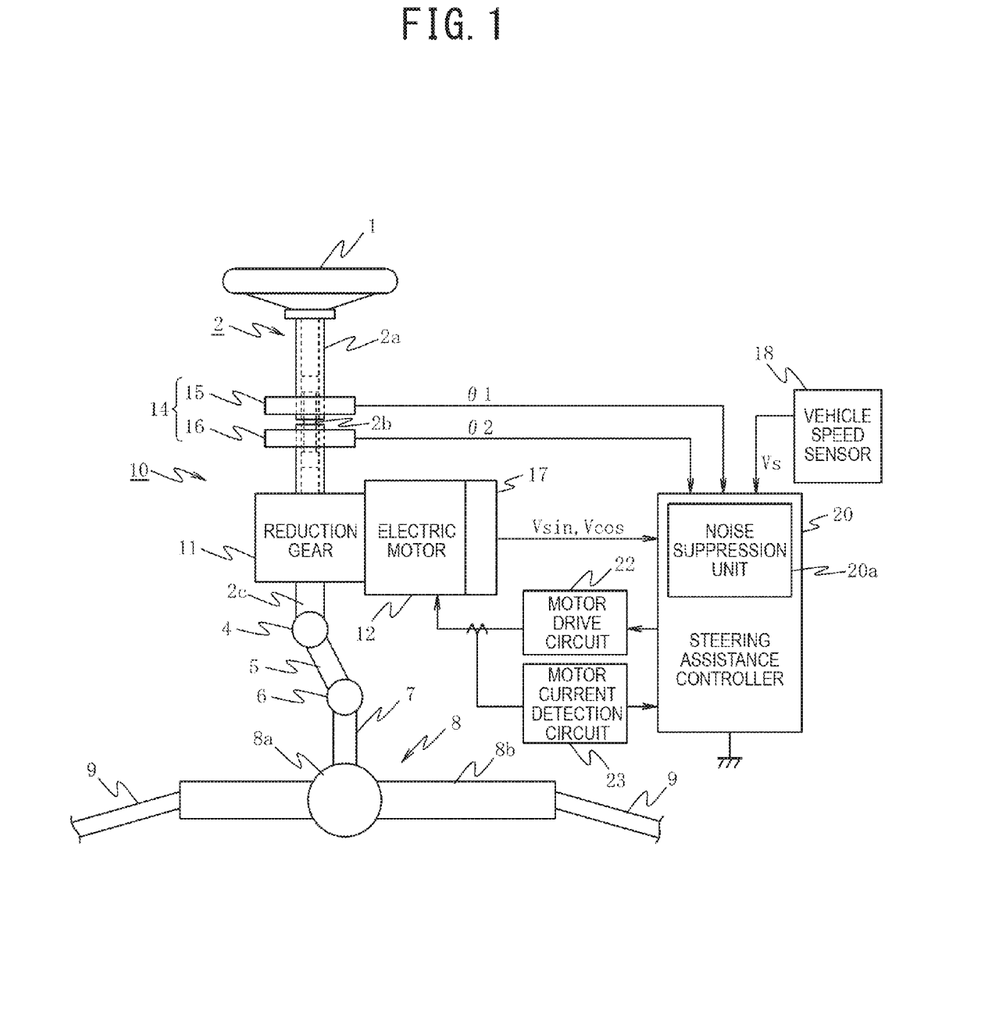
FIG. 1 is a configuration view of an electric power steering device.

FIG. 1 is an overall configuration view of an electric power steering device in one embodiment of the present invention. In the drawings, reference numeral 1 denotes a steering wheel, and the steering wheel 1 is attached at one end of a steering shaft 2 on the rear side of a vehicle. The steering shaft 2 includes an input shaft 2a to which the steering force exerted by a driver is transmitted via the steering wheel 1, and an output shaft 2c coupled through a torsion bar 2b with the input shaft 2a.

Then, the steering force transmitted to the output shaft 2c is transmitted to a lower shaft 5 via a universal joint 4, and is further transmitted to a pinion shaft 7 via a universal joint 6. The steering force transmitted to the pinion shaft 7 is transmitted to a tie rod 9 via a steering gear mechanism 8, and steers the turning wheels, not illustrated. Here, the steering gear mechanism 8 is configured in rack and pinion type including a pinion 8a coupled with the pinion shaft 7 and a rack 8b engaging the pinion 8a, and converts the rotational movement transmitted to the pinion 8a into a linear movement by the rack 8b.

The output shaft 2c of the steering shaft 2 is coupled with the steering assistance mechanism 10 that transmits the steering assistance force to the output shaft 2c. The steering assistance mechanism 10 includes a reduction gear mechanism 11 coupled with the output shaft 2c, and an electric motor 12 including, for example, a brushless motor coupled with the reduction gear mechanism 11 and producing the steering assistance force.

Then, a torque sensor 14 operating as a torque detector is arranged to detect a twist angle displacement of the torsion bar 2b arranged between the input shaft 2a and the output shaft 2c, and to detect steering torque.

The torque sensor 14 includes, as illustrated in FIG. 1, an input shaft rotational angle sensor 15 operating as an input shaft rotational angle detector including, for example, a rotary encoder configured to detect a rotational angle of the input shaft 2a, and an output shaft rotational angle sensor 16 operating as an output shaft rotational angle detector including, for example, a rotary encoder configured to detect a rotational angle of the output shaft 2c. The input shaft rotational angle sensor 15 detects the rotational angle of the input shaft 2a, and outputs an input shaft rotational angle detection value θ1. In addition, the output shaft rotational angle sensor 16 detects the rotational angle of the output shaft 2c, and outputs a first output shaft rotational angle detection value θ2.

Further, the motor rotational angle of the electric motor 12 coupled via the reduction gear mechanism 11 with the output shaft 2c is detected by a resolver 17. The resolver 17 receives an excitation signal $\sin\omega t$ of a sine wave, and outputs a sine wave signal Vsin and a cosine wave signal Vcos represented by the following expressions (1) and (2).

$$V\sin = A\sin\omega t \cdot \sin\theta m \quad (1)$$

$$V\cos = A\sin\omega t \cdot \cos\theta m \quad (2)$$

Then, the input shaft rotational angle detection value θ1 detected by the input shaft rotational angle sensor 15 included in the torque sensor 14, the first output shaft rotational angle detection value θ2 detected by the output shaft rotational angle sensor 16, and the sine wave signal Vsin and the cosine wave signal Vcos detected by the resolver 17 are supplied to a steering assistance controller 20. The steering assistance controller 20 also receives a vehicle speed detection value Vs detected by a vehicle speed sensor 18.

The steering assistance controller 20 includes a noise suppression unit 20a configured to carryout a noise reduction process on the first output shaft rotational angle detection value θ2 by using the motor rotational angle signal θm.

Figure 2:
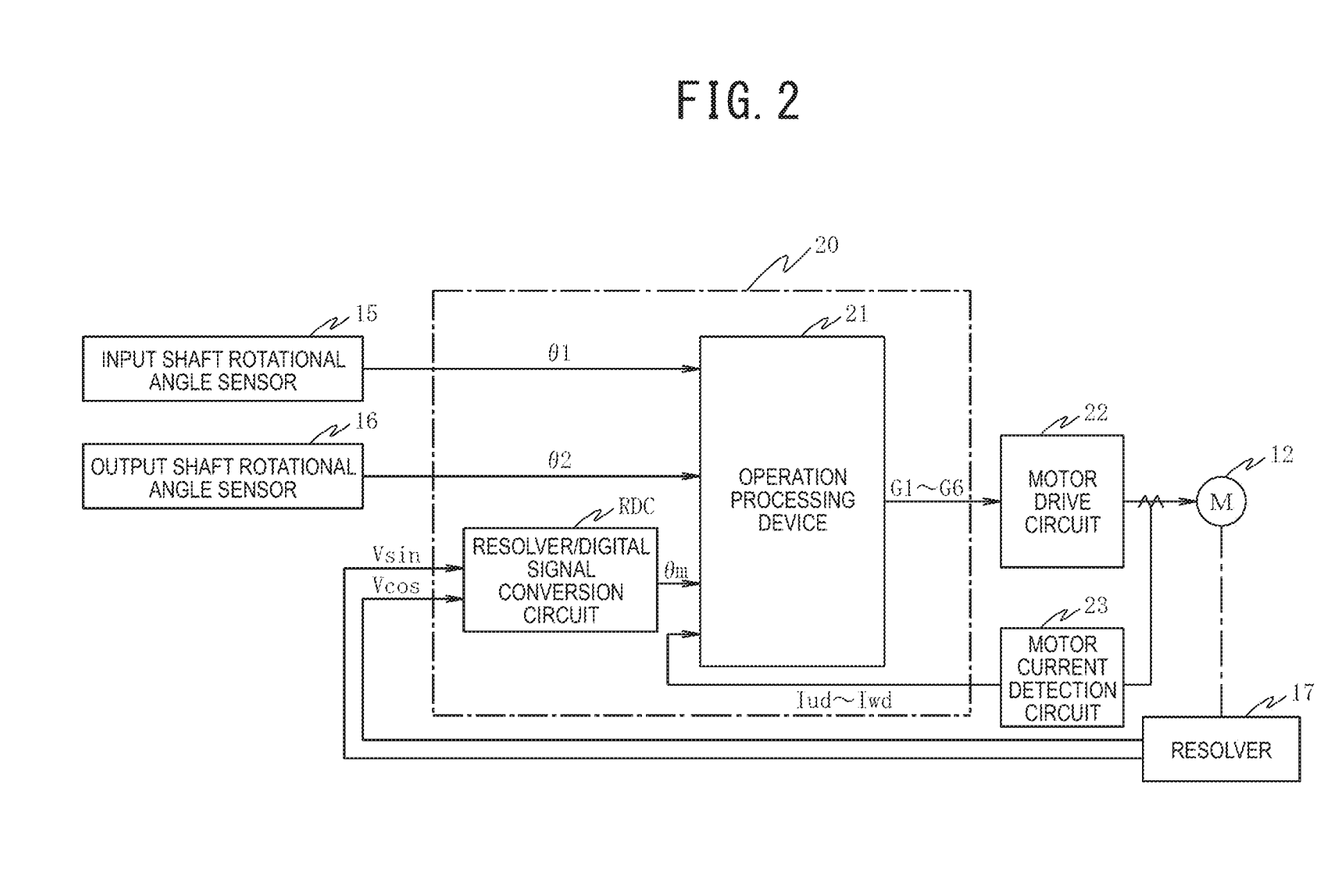
FIG. 2 is a block diagram of a steering assistance controller.

As a specific configuration of the steering assistance controller 20, as illustrated in FIG. 2, a resolver/digital signal conversion circuit RDC is provided to receive the sine wave signal Vsin and the cosine wave signal Vcos output from the resolver 17, and to convert the resolver signals into the motor rotational angle signal θm, which is a digital value.

In addition, the steering assistance controller 20 includes an operation processing device 21 including a microcomputer, a micro control unit, or the like. The operation processing device 21 receives the input shaft rotational angle detection value θ1 detected by the input shaft rotational angle sensor 15, the first output shaft rotational angle detection value θ2 detected by the output shaft rotational angle sensor 16, the motor rotational angle signal θm, and motor current detection values Iud to Iwd detected by the motor current detection circuit 23. The steering assistance controller 20 also includes a motor drive circuit 22 configured to receive pulse width modulation signals output from the operation processing device 21, and to rotationally drive the electric motor 12.

Figure 3:
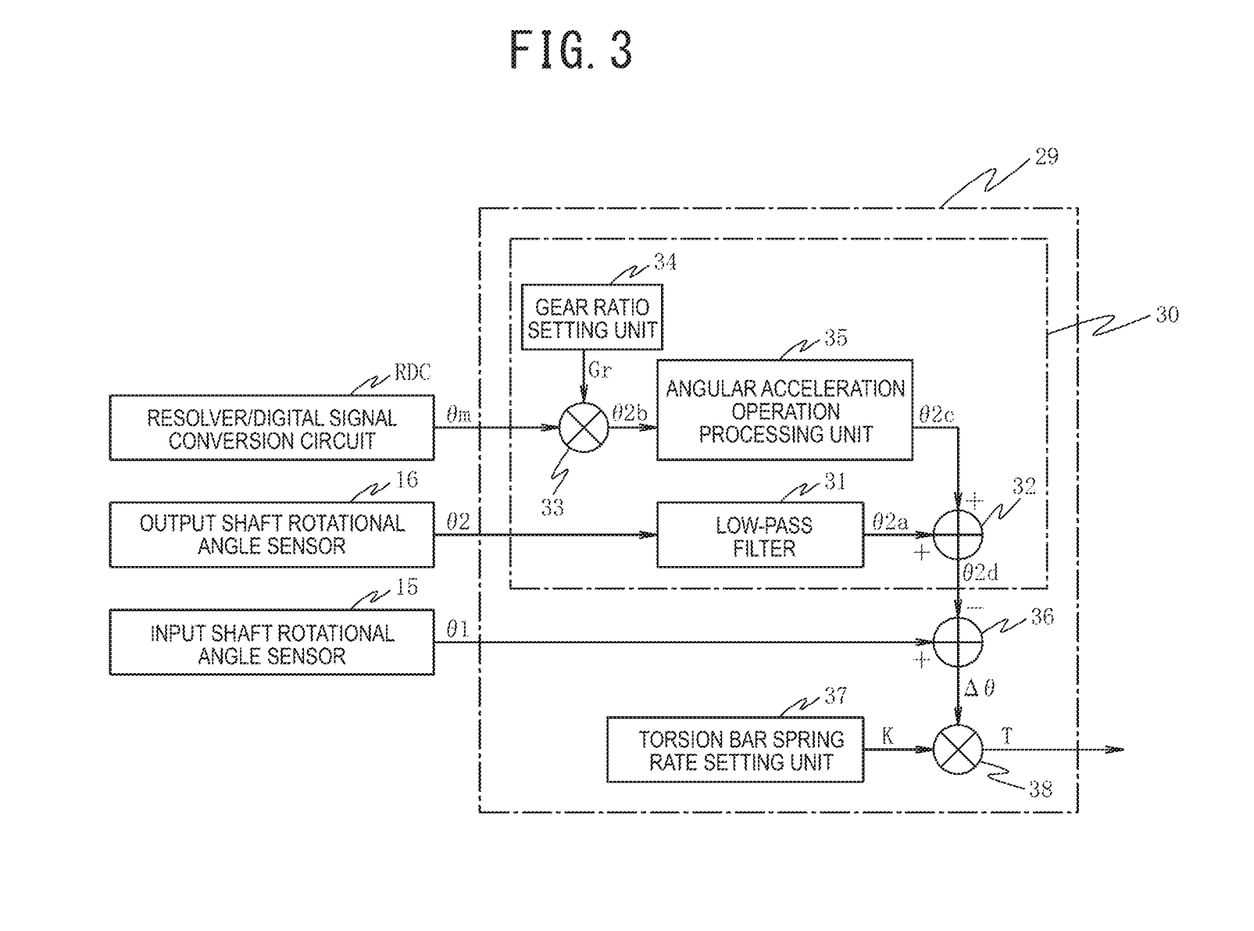
FIG. 3 is a functional block of a steering assistance torque detector of an operation processing device of the steering assistance controller.
Figure 4:
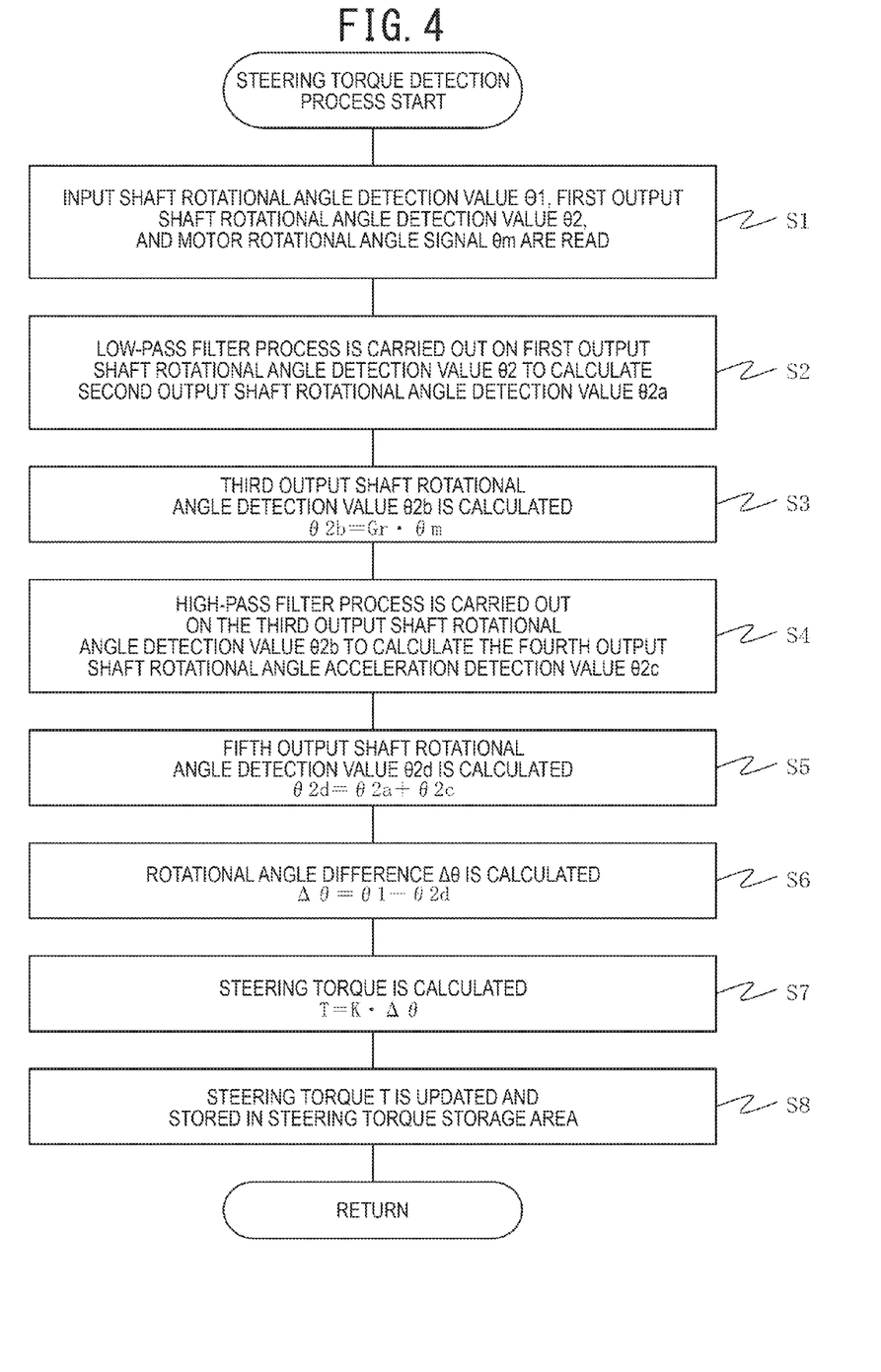
FIG. 4 is a flowchart of an example of a steering torque detection process procedure carried out by the operation processing device.
Figure 5:
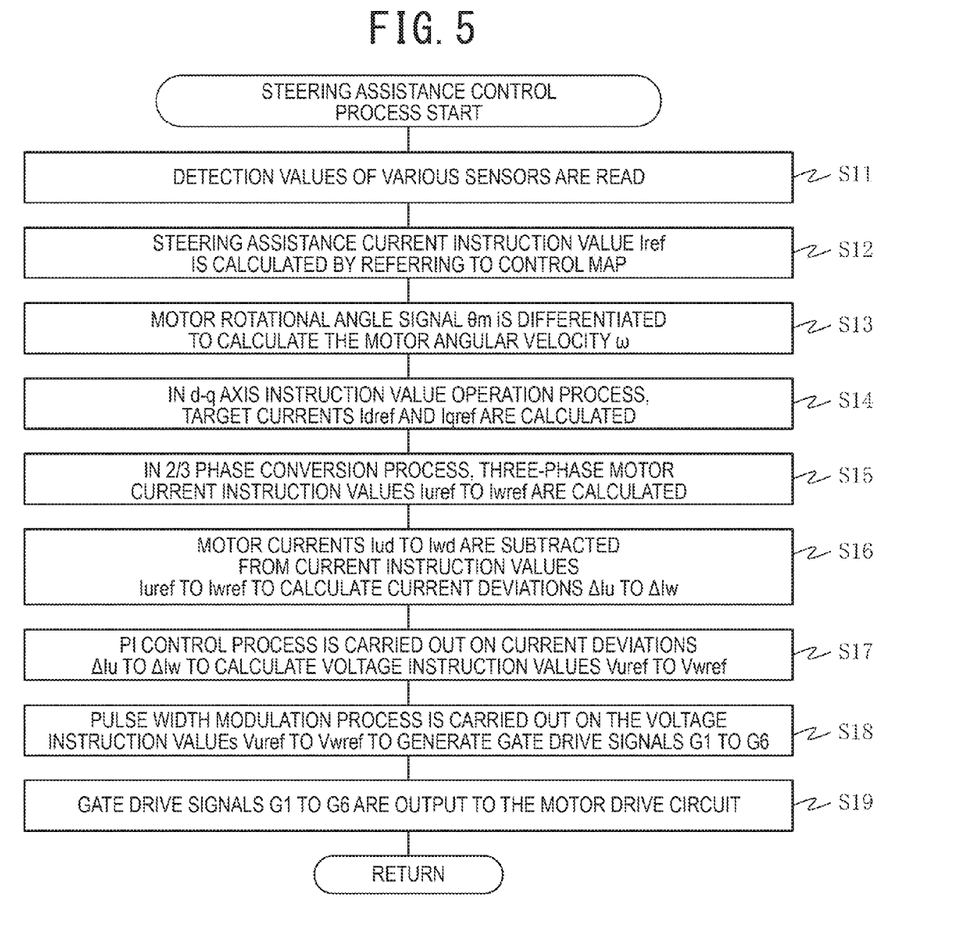
FIG. 5 is a flow chart of an example of a steering assistance control process procedure carried out by the operation processing device.

The operation processing device 21 is configured to carry out a steering torque detection process represented by a functional block diagram of FIG. 3 and a flowchart of FIG. 4, and the steering assistance control process illustrated in FIG. 5 to generate gate drive signals G1 to G6 to be output to the motor drive circuit 22, and to output the generated gate drive signals G1 to G6 to the motor drive circuit 22.

The functional block diagram of FIG. 3 illustrates a steering torque detector 29. The steering torque detector 29 includes a noise suppression unit 30 corresponding to the noise suppression unit 20a.

In the noise suppression unit 30, the first output shaft rotational angle detection value θ2 detected by the output shaft rotational angle sensor 16 is input into a low-pass filter (i.e., lowpass filter) 31 to remove a high-frequency noise component and supply a second output shaft rotational angle detection value θ2a that is a filter output in which the noise component has been removed to an adder 32.

In addition, in the noise suppression unit 30, a multiplier 33 is configured to multiply the motor rotational angle signal θm input from the resolver/digital signal conversion circuit RDC by a gear ratio of the reduction gear mechanism 11 set by a gear ratio setting unit 34 so as to convert the motor rotational angle signal θm into a third output shaft rotational angle detection value θ2b. Then, multiplier 33 supplies the third output shaft rotational angle detection value θ2b to an angular acceleration operation processing unit 35, and a fourth output shaft rotational angle acceleration signal θ2c in which a high-frequency spectrum is emphasized is obtained.

Here, the angular acceleration operation processing unit 35 is not limited in particular, and can be selected appropriately depending on the purpose, as far as the third output shaft rotational angle detection value θ2b is converted into an output shaft rotational angle acceleration signal (operation process of differentiation of second order). Two high-pass filters (i.e., highpass filters) can be given as examples of the angular acceleration operation processing unit 35.

Subsequently, the angular acceleration operation processing unit 35 is configured to supply the fourth output shaft rotational angle acceleration signal θ2c, in which a high-frequency spectrum is emphasized and which is output from the angular acceleration operation processing unit 35, to the adder 32 as described above. The adder 32 is configured to add the fourth output shaft rotational angle acceleration signal θ2c to the second output shaft rotational angle signal θ2a output from the low-pass filter 31 to calculate a fifth output shaft rotational angle signal θ2d in which the high-frequency output shaft rotational angle signal has been compensated.

Then, in the steering torque detector 29, the fifth output shaft rotational angle detection value θ2d output from the noise suppression unit 30 is supplied to a subtracter 36, into which the input shaft rotational angle detection value θ1 is also input from the input shaft rotational angle sensor 15, so that the subtracter 36 subtracts the fifth output shaft rotational angle detection value θ2d from the input shaft rotational angle detection value θ1 to calculate a rotational angle difference Δθ(=θ1−θ2d) of the torsion bar 2b.

In addition, in the steering torque detector 29, a torsion bar spring rate setting unit 37 is configured to supply the rotational angle difference Δθ of the torsion bar to a multiplier 38 into which a predefined torsion bar spring rate K of the torsion bar 2b is input, to multiply the rotational angle difference Δθ by the torsion bar spring rate K, and to calculate the steering torque T (=K·Δθ).

In addition, the operation processing device 21 carries out a steering torque detection process illustrated in FIG. 4 corresponding to the functional block diagram of FIG. 3. The steering torque detection process is carried out as a timer interruption process at every predetermined time (for example, 1 msec). Firstly, in step S1, the input shaft rotational angle detection value θ1, the first output shaft rotational angle detection value θ2, and the motor rotational angle signal θm are read, and then processing goes to step S2.

In step S2, a low-pass filter process is carried out on the first output shaft rotational angle detection value θ2 to calculate the second output shaft rotational angle detection value θ2a in which high-frequency noise components has been removed. Subsequently, processing goes to step S3, and the motor rotational angle signal θm read in step S1 is multiplied by a gear ratio Gr to calculate the third output shaft rotational angle detection value θ2b.

Then, processing goes to step S4, a high-pass filter process is carried out on the third output shaft rotational angle detection value θ2b twice to calculate the fourth output shaft rotational angle acceleration detection value θ2c in which high-frequency components are emphasized.

Subsequently, processing goes to step S5, the fourth output shaft rotational angle acceleration detection value θ2c in which the high-frequency components are emphasized in the calculation of step S4 is added to the second output shaft rotational angle detection value θ2a calculated in step S2 to reduce the noise components and calculate the fifth output shaft rotational angle detection value θ2d in which the high-frequency component of the second output shaft rotational angle detection value θ2a is compensated.

Subsequently, processing goes to step S6, the fifth output shaft rotational angle detection value θ2d calculated in step S5 is subtracted from the input shaft rotational angle detection value θ2 read in step S1 to calculate the rotational angle difference Δθ between the input shaft side and the output shaft side of the torsion bar 2b.

Then, processing goes to step S7, the rotational angle difference Δθ that has been calculated is multiplied by the predefined torsion bar spring rate K of the torsion bar 2b to calculate the steering torque T (=K·Δθ), and then processing goes to step S8. The steering torque T that has been calculated is updated and stored in a steering torque storage area in the memory such as a RAM, the timer interruption process is ended, and processing returns to a predetermined main program.

The process of FIG. 4 corresponding to a steering torque detector, and the processes of step S1 to step S5 correspond to the noise suppression unit 30.

Further, the operation processing device 21 carries out the steering assistance control process illustrated in FIG. 5. The steering assistance control process is carried out as a main program. Firstly, in step S11, the detection values of various sensors such as the vehicle speed sensor 18, the motor current detection circuit 23, and the resolver/digital signal conversion circuit RDC, and the steering torque T stored in the steering torque storage area of the memory are read. Subsequently, processing goes to step S2, and a steering assistance current instruction value Iref is calculated based on the steering torque T and the vehicle speed detection value Vs, by referring to a steering assistance current instruction value calculation map illustrated in FIG. 6. Then, processing goes to step S13.

Figure 6:
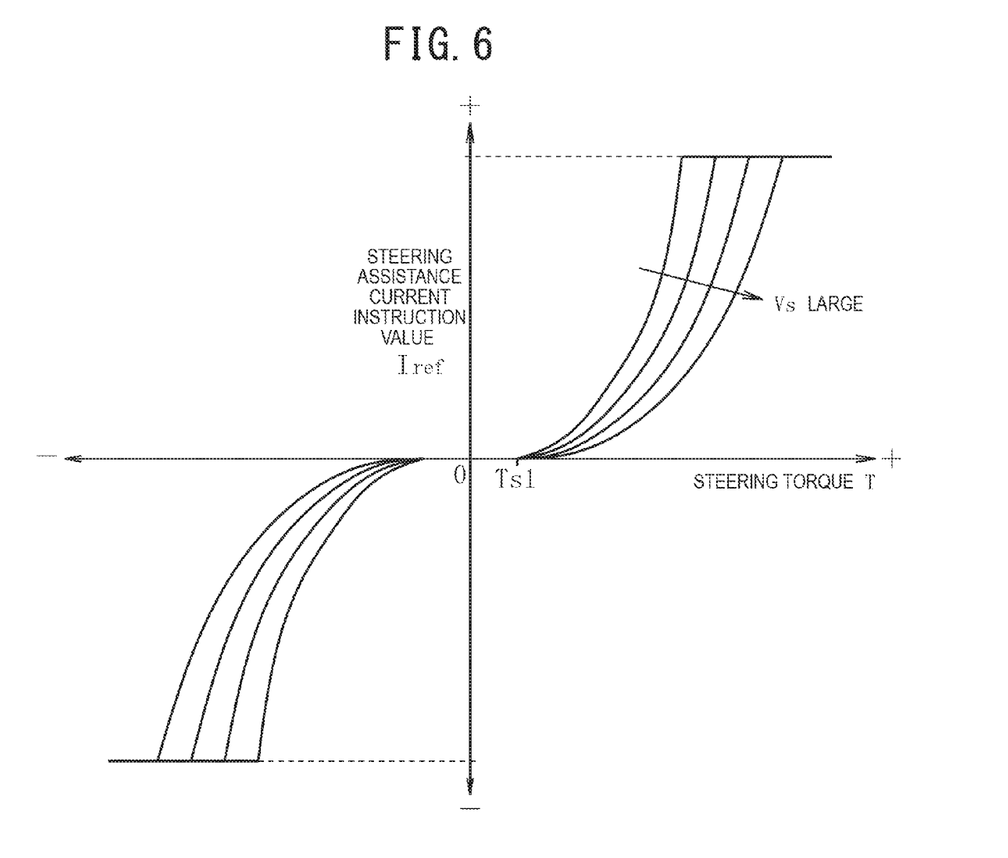
FIG. 6 is a characteristic diagram of a steering assistance current instruction value calculation map.

In the steering assistance current instruction value calculation map, as illustrated in FIG. 6, the horizontal axis represents the steering torque T, the vertical axis represents the steering assistance current instruction value Iref, and the characteristic diagrams represented by parabola-shaped curves with the vehicle speed detection value Vs being as a parameter. The steering assistance current instruction value Iref keeps "0" during a period from the steering torque T "0" to a set value Ts1 that is close to "0". When the steering torque T exceeds the set value Ts1, in the beginning, the steering assistance current instruction value Iref increases relatively moderately to the increasing steering torque T. However, when the steering torque T further increases, the steering assistance current instruction value Iref increases steeply to the increase. The characteristic curve is set such that the inclination is smaller as the vehicle speed increases.

In step S13, the motor rotational angle signal θm is differentiated to calculate the motor angular velocity co. Subsequently, processing goes to step S14, a d-q axis instruction value operation process is carried out on the steering assistance current instruction value Iref by using the motor rotational angle signal θm and the motor angular velocity ω to calculate a d-axis target current Idref and a q-axis target current Iqref.

Then, processing goes to step S15, a ⅔ phase conversion process of converting the d-axis target current Idref and the q-axis target current Iqref into three-phase motor current instruction values Iuref, Ivref, and Iwref to calculate the three-phase motor current instruction values Iuref, Ivref, and Iwref, and then processing goes to step S16.

In step S16, the motor current detection values Iud, Ivd, and Iwd are respectively subtracted from the motor current instruction values Iuref, Ivref, and Iwref to calculate current deviations ΔIu, ΔIv, and ΔIw. Subsequently, processing goes to step S17, a PI control process is carried out on the current deviations ΔIu, ΔIv, and ΔIw to calculate voltage instruction values Vuref, Vvref, and Vwref.

Then, processing goes to step S18, and the pulse width modulation processes are carried out on the voltage instruction values Vuref, Vvref, and Vwref that have been calculated to generate gate drive signals G1 to G6 of an inverter included in the motor drive circuit 22. Subsequently, processing goes to step S19, the gate drive signals G1 to G6 that have been generated are output to the motor drive circuit 22, and then the steering assistance control process is ended and processing returns to the predetermined main program.

Next, operations of the above embodiments will be described.

The operation processing device 21 of the steering assistance controller 20 reads the input shaft rotational angle detection value θ1 detected by the input shaft rotational angle sensor 15 and the first output shaft rotational angle detection value θ2 detected by the output shaft rotational angle sensor 16, supplies the sine wave signal Vsin and the cosine wave signal Vcos detected by the resolver 17 to the resolver/digital signal conversion circuit RDC, calculates the motor rotational angle signal θm, and multiplies the calculated motor rotational angle signal θm by the gear ratio Gr to calculate the second output shaft rotational angle detection value θ2b.

Figure 7A:
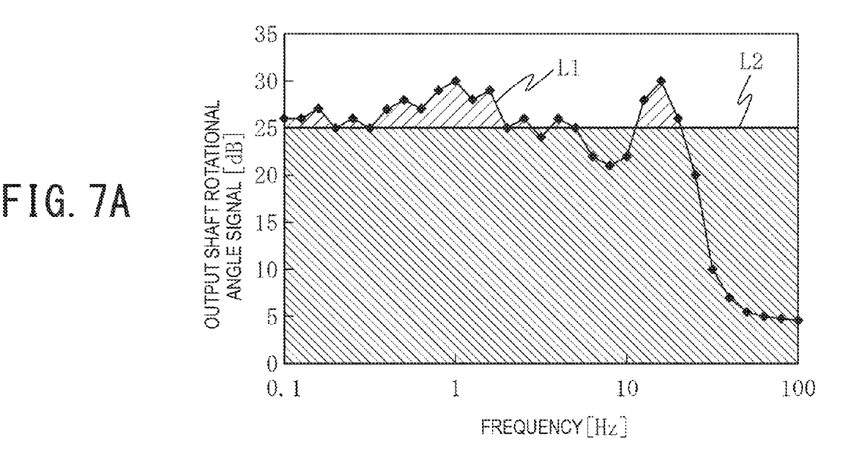
FIG. 7A and FIG. 7B are waveform diagrams of an output shaft rotational angle detection signal and a motor rotational angle detection signal.

In this situation, as to the first output shaft rotational angle detection value θ2 detected by the output shaft rotational angle sensor 16, angle signal components represented by a characteristic curve L1 and noise components of, for example, 25 dB or smaller represented by a characteristic curve L2 are superimposed with each other in FIG. 7A.

Figure 7B:
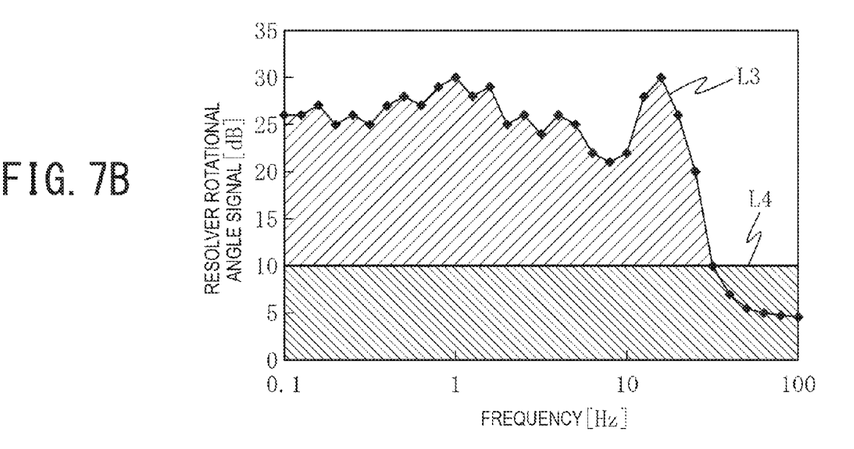

On the other hand, as to the second output shaft rotational angle detection value θ2b based on the sine wave signal Vsin and the cosine wave signal Vcos detected by the resolver 17, angle signal components represented by a characteristic curve L3 and noise components of, for example, 10 dB or smaller represented by a characteristic curve L4 are superimposed with each other in FIG. 7B.

When the angle signal components are larger than the noise components in each of the first output shaft rotational angle detection value θ2 detected by the output shaft rotational angle sensors 16 and the second output shaft rotational angle detection value θ2b based on the detection signal of the resolver 17, the angle signal components can be used as angle information. However, when the angle signal components are equal to or smaller than the noise components, the angle signal is corrupted by the noise and the angle signal components cannot be used as the angle information.

Figures 8A, 8B:
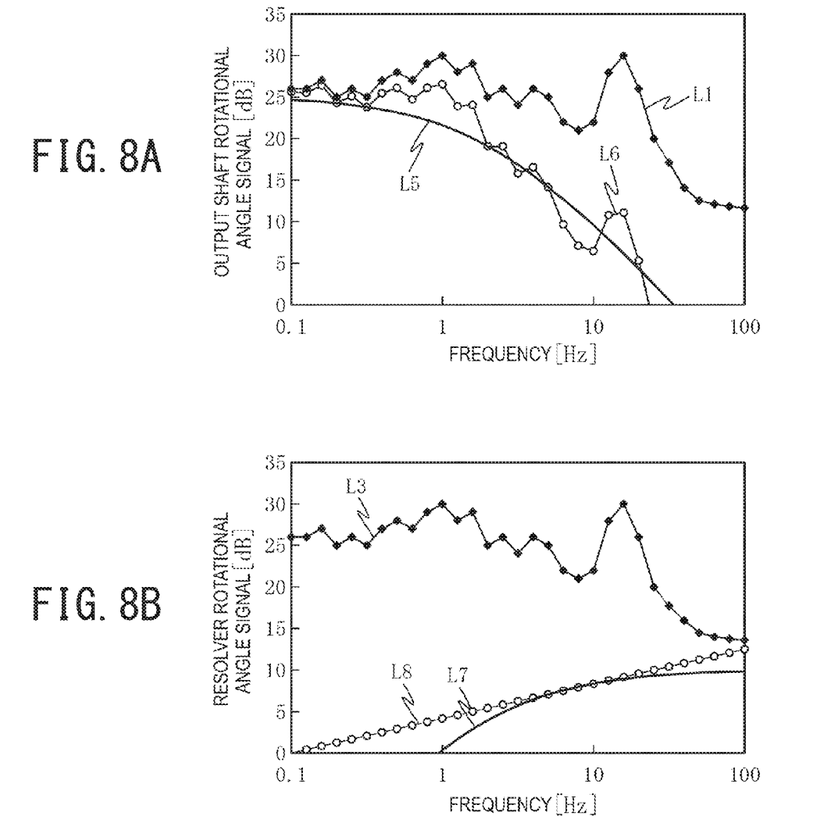
FIG. 8A to FIG. 8C are waveform diagrams of low-pass filter outputs, high-pass filter outputs, and added outputs of the both.

Accordingly, as to the first output shaft rotational angle detection value θ2, the high-frequency components equal to or higher than about 2 Hz are smaller than the noise components. As described above, the first output shaft rotational angle detection value θ2 is supplied to the low-pass filter 31 to be subject to the Low-pass filter process. The third output shaft rotational angle detection value θ2a indicating a low-pass filter process result is illustrated in FIG. 8A. The noise component, as indicated by a characteristic curve L5, gradually attenuates from 0.1 Hz and becomes "0" at about 32 Hz. However, the first output shaft rotational angle detection value 82 also attenuates from about 0.2 Hz in a similar manner to the noise component as indicated by a characteristic curve L6, as compared to the original characteristic curve L1. Hence, the second output shaft rotational angle detection value θ2a equal to or higher than about 1.2 Hz cannot be used as the angle signal.

Thus, the second output shaft rotational angle detection value θ2b having a similar level to the first output shaft rotational angle detection value θ2 and a low-level noise component, based on the detection signal of the resolver 17, is supplied to the angular acceleration operation processing unit 35 to be subject to the high-pass filter process, as described above. As to the fourth output shaft rotational angle acceleration detection value θ2c representing a high-pass filter process result, as illustrated in FIG. 8B, the noise component indicated by a characteristic curve L7 is gradually lower as the frequency is lower from 100 Hz and becomes "0" at about 1 Hz. Also as to the fourth output shaft rotational angle detection value θ2c, the frequency is lower monotonously from 100 Hz as indicated by a characteristic curve L8, and becomes substantially "0" at 0.1 Hz.

Figure 8C:
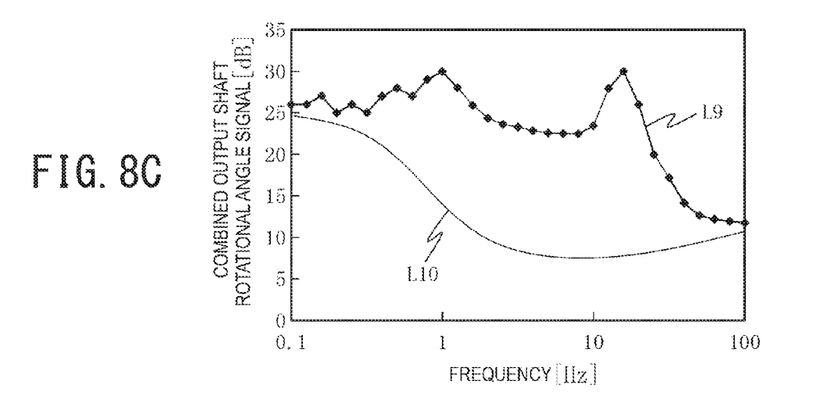

Therefore, the adder 32 adds the third output shaft rotational angle detection value θ2a and the fourth output shaft rotational angle acceleration detection value θ2c to obtain the fifth output shaft rotational angle detection value θ2d. As indicated by a characteristic curve L9 of FIG. 8C, the fifth output shaft rotational angle detection value θ2d is a signal in which the attenuation at the high-frequency range of equal to or higher than about 2 Hz of the third output shaft rotational angle signal θ2a that has been subjected to the low-pass filter process is compensated with the fourth output shaft rotational angle acceleration detection value θ2c that has been subjected to the high-pass filter process. The signal component is higher than the noise component indicated by a characteristic curve L10 from 0.1 Hz of a low-frequency range to about 100 Hz of a high-frequency range, and the available range used as the angle information can be largely expanded. It is to be noted that, since the phase of the angular acceleration advances from the angular velocity by 90 degrees only, the energy decrease in 1 Hz to 10 Hz of FIG. 8C does not cause a problem. Rather, the stability of the system improves and desirable results are easily obtainable.

Then, the fifth output shaft rotational angle detection value θ2d output from the adder 32 is supplied to the subtracter 36, and the fifth output shaft rotational angle signal θ2d is subtracted from the input shaft rotational angle signal θ1 based on the detection signal of the input shaft rotational angle sensor 15 so as to calculate the rotational angle difference Δθ. Then, the calculated rotational angle difference Δθ is multiplied by the torsion bar spring rate K, so that the steering torque T (=K·Δθ) that is correct can be calculated, and the calculated steering torque T is updated and stored in the steering torque storage area of the memory.

On the other hand, the operation processing device 21 carries out the steering assistance control process illustrated in FIG. 5. The operation processing device 21 reads the steering torque T updated and stored in the steering torque storage area of the memory, and also reads the vehicle speed detection value Vs detected by the speed sensor 18 and the motor rotational angle signal θm based on the detection signal of the resolver 17 (step S11). The operation processing device 21 calculates the steering assistance current instruction value Iref based on the steering torque T and the vehicle speed detection value Vs, by referring to the steering assistance current instruction value calculation map illustrated in FIG. 6 (step S12).

In this state, when the vehicle is in a stop state and in a non-operating state where a driver is not operating the steering wheel 1, the steering torque T is "0" and the vehicle does not travel and hence the vehicle speed detection value Vs is also "0". Accordingly, the steering assistance current instruction value Iref calculated by referring to the control map of FIG. 6 is also "0". Since the electric motor 12 does not travel, the resolver/digital signal conversion circuit RDC calculates the motor rotational angle signal θm based on the sine wave signal Vsin and the cosine wave signal Vcos detected by the resolver 17, but the motor angular velocity ω is "0". The steering assistance current instruction value Iref "0" is subject to the d-q axis current instruction value operation process, so that the instruction value operation in the d-q axis coordinate system is carried out based on the motor rotational angle signal θm and the motor angular velocity ω to calculate the d-axis target current Idref and the q-axis target current Iqref. The d-axis target current Idref and the q-axis target current Iqref are subject to the ⅔ phase conversion, and are respectively converted into the three-phase motor current instruction values Iuref to Iwref of "0".

On the other hand, since the motor drive circuit 22 is not operating, the detection currents Iud to Iwd detected by the motor current detection circuit 23 is also "0". Hence, the current deviations ΔIu to ΔIw between the three-phase current instruction values Iuref to Iwref and the motor current detection values Iu to Iw are also "0". The voltage instruction values Vuref to Vwref calculated in the PI current control process are also "0", and the gate drive signals G1 to G6 in which the voltage instruction values Vuref to Vwref that have been subjected to the pulse width modulation are also in off states. The gate drive signals G1 to G6 are to be output to switching elements of the inverter included in the motor drive circuit 22, the motor drive currents Imu to Imw output from the motor drive circuit 22 are also "0", and the electric motor 12 maintains the stop state.

In the stop state of the electric motor 12, when the steering wheel 1 is turned to the right (or to the left), that is so-called stationary steering, the steering torque detection process is carried out as described above to calculate the steering torque T. The calculated steering torque T is updated and stored in the steering torque storage area of the memory. Therefore, the vehicle speed detection value Vs is "0" in the steering assistance control process to be carried out by the operation processing device 21 in FIG. 5. Hence, the characteristic curve on most inner side is selected and the steering assistance current instruction value Iref is calculated to have a larger value early in accordance with an increase in the steering torque T. In addition, the electric motor 12 is rotated by steering, and the motor angular velocity ω is calculated.

Therefore, the d-axis current instruction value Idref and the q-axis current instruction value Iqref are calculated based on the steering assistance current instruction value Iref, the d-axis current instruction value Idref and the q-axis current instruction value Iqref are subject to the ⅔ phase conversion, and the three-phase motor current instruction values Iuref to Iwref are calculated.

In this situation, since the motor current detection values Iud to Iwd detected by the motor current detection circuit 23 is "0", the current deviations ΔIu to ΔIw respectively match values of the current instruction values Iuref to Iwref. By carrying out the PI control process, the voltage instruction values Vuref to Vwref are calculated. By carrying out the pulse width modulation on the voltage instruction values Vuref to Vwref, the gate drive signals G1 to G6 are calculated, and the calculated gate drive signals G1 to G6 are output to the motor drive circuit 22.

Therefore, the gate drive signals G1 to G6 are supplied to each of the switching elements of the inverter included in the motor drive circuit 22, the motor currents Imu to Imw having predefined values are output from the motor drive circuit 22, the electric motor 12 is rotationally driven, and the steering assistance torque depending on the steering torque T is generated. Since the steering assistance torque is transmitted through the reduction gear mechanism 11 to the output shaft 2c of the steering shaft 2, the steering wheel in the stationary steering can be operated lightly.

Subsequently, when the vehicle starts to travel, the vehicle speed detection value Vs detected by the vehicle speed sensor 18 is increased. When the steering wheel 1 is operated in traveling, as the steering assistance current instruction value Iref calculated in the steering assistance control process, the characteristic curve on an outer side in the map of FIG. 6 is selected as the vehicle speed detection value Vs is larger. Hence, as an increased amount of the steering assistance current instruction value Iref corresponding to an increase of the steering torque T is smaller, the steering assistance torque generated by the electric motor 12 has a smaller value than that in the stationary steering, and optimal steering assistance torque depending on the vehicle speed detection value Vs can be generated.

In the above-described embodiments, the low-pass filter process is carried out on the first output shaft rotational angle detection value θ2 detected by the output shaft rotational angle sensor 16, and the high-pass filter process is carried out on the third output shaft rotational angle detection value θ2b based on the sine wave signal Vsin and the cosine wave signal Vcos detected by the resolver 17. Both of the filter process results are merely added to attenuate the noise component of the angle signal component.

Thus, this configuration eliminates the on/off switching of the filter in accordance with various situations to compensate a phase delay in the digital filter process in a conventional example as described above, and also eliminates the drawback that the filter effect is not available when the filter is off. A smooth steering feel without a change is achievable at a low cost.

In addition, in the above-described embodiments, since the phase delay is reduced even in higher vibration components (50 Hz to 100 Hz) higher than those of the angular acceleration signals, the stable steering control can be performed even in the region where the feedback is unavailable in the conventional example.

It is to be noted that in the above-described embodiments, the descriptions have been given to the case where the low-pass filter 31 carries out the low-pass filter process on the first output shaft rotational angle detection value θ2 and the angular acceleration operation processing unit 35 including the two high-pass filters carries out the high-pass filter process on the third output shaft rotational angle detection value θ2b. However, the present invention is not limited to the above case. Instead of the low-pass filter 31, a filter having a signal smooth characteristic (for example, a filter having a relatively lower transmission gain in the high-frequency region than that of the low-frequency region) may be applicable. Instead of the angular acceleration operation processing unit 35, a filter having a high-frequency emphasis characteristic (for example, a filter having a relatively higher transmission gain in the high-frequency region than that of the low-frequency region) may be applicable. As the filter having a signal smooth characteristic, a filter output in which the low-pass filter process is carried out on the first output shaft rotational angle detection value θ2 can be added to the first output shaft rotational angle detection value θ2. As the filter having a high-frequency emphasis characteristic, a filter output in which the high-pass filter process is carried out on the third output shaft rotational angle detection value θ2b can be added to the third output shaft rotational angle detection value θ2b. Here, the filter having a signal smooth characteristic and the filter having a high-frequency emphasis characteristic can be set to have paired characteristics.

Further, in the above-described embodiments, the descriptions have been given of the case where the resolver/digital signal conversion circuit RDC converts the detection signal of the resolver 17 into a digital signal, and then the converted digital signal is input into the operation processing device 21. However, the present invention is not limited to the above case. The detection signal of the resolver 17 may be supplied to an A/D conversion input terminal of the operation processing device 21, so that the operation processing device 21 may carry out the resolver/digital signal conversion process.

Furthermore, in the above-described embodiments, the descriptions have been given of the case where the input shaft rotational angle sensor 15 and the output shaft rotational angle sensor 16 included in the torque sensor are configured with a rotary encoder. However, the present invention is not limited to the above case. Other rotational angle sensors such as rotary potentiometers or resolvers are applicable.

Moreover, in the above-described embodiments, the descriptions have been given of the case where the present invention is applied to column type electric power steering devices. However, the present invention is not limited to the above case. The present invention is applicable to pinion type electric power steering devices, in each of which the steering assistance force is transmitted to the pinion shaft of the rack and pinion type steering gear mechanism, or to rack type electric power steering devices, in each of which the steering assistance force is transmitted to a rack shaft. In these cases, the torsion bar can be arranged between the universal joint 6 and the pinion shaft 7 and the steering torque T can be calculated from the rotational angle difference between the universal joint 6 and the pinion shaft 7, which interpose the torsion bar.

Heretofore, the present invention has been described with specific embodiments, but the descriptions do not intend to limit the present invention. Other embodiments of the present invention are apparent to a person skilled in the art by referring to the descriptions of the present invention together with various modifications of the embodiments disclosed herein. Therefore, it should be understood that the scopes of claims in the present invention cover these modifications or embodiments included in the scopes and subject matters of the present invention.

REFERENCE SIGNS LIST

1 . . . steering wheel, 2 . . . steering shaft, 2a . . . input shaft, 2b . . . torsion bar, 2c . . . output shaft, 8 . . . steering gear mechanism, 10 . . . steering assistance mechanism, 11 . . . reduction gear mechanism, 12 . . . electric motor, 14 . . . torque sensor, 15 . . . input shaft rotational angle sensor, 16 . . . output shaft rotational angle sensor, 17 . . . resolver, 18 . . . vehicle speed sensor, 20 . . . steering assistance controller, RDC . . . resolver/digital signal conversion circuit, 21 . . . operation processing device, 22 . . . motor drive circuit, 23 . . . motor current detection circuit, 31 . . . low-pass filter, 32 . . . adder, 33 . . . multiplier, 34 . . . gear ratio setting unit, 35 . . . angular acceleration operation processing unit, 36 . . . subtracter, 37 . . . torsion bar spring rate setting unit, 38 . . . multiplier

The invention claimed is:
1. An electric power steering device comprising:
a torque detector comprising an input shaft rotational angle detector and an output shaft rotational angle detector configured to individually detect rotational angles of an input shaft and an output shaft coupled by a torsion bar arranged in a steering system of a vehicle;
an electric motor configured to be controlled based on a torque detection value detected by the torque detector, and to generate a steering assistance force to be exerted on the output shaft;
a motor rotational angle detector configured to detect a motor rotational angle of the electric motor; and a noise suppression unit configured to reduce a noise in a signal of the rotational angle of the output shaft detected by the output shaft rotational angle detector, by using the motor rotational angle detected by the motor rotational angle detector, wherein the noise suppression unit comprises:

a first filter configured to carry out a filter process on the signal of the rotational angle of the output shaft detected by the output shaft rotational angle detector such that a transmission gain in a high frequency is relatively smaller than a transmission gain in a low frequency; and a second filter configured to carry out an angular acceleration operation process of the electric motor detected by the motor rotational angle detector, wherein the noise suppression unit is configured to add a first filter output from the first filter to a second filter output from the second filter to calculate a noise reduced output shaft rotational angle signal, and wherein the second filter includes two filters made of either one of high-pass filters or filters having a high-frequency emphasis characteristic, and the motor rotational angle is subject to differentiation of second order by use of the two filters.

2. The electric power steering device according to claim 1, wherein the torque detector is configured to multiply a torsion bar rate by a value obtained by reducing the noise reduced output shaft rotational angle signal from a signal of the rotational angle of the input shaft detected by the input shaft rotational angle detector, to calculate steering torque.

3. The electric power steering device according to claim 2, wherein the first filter is made of either one of a low-pass filter or a filter having a signal smooth characteristic.

4. The electric power steering device according to claim 1, wherein the first filter is made of either one of a low-pass filter or a filter having a signal smooth characteristic.

5. The electric power steering device according to claim 4, wherein the electric motor is coupled with the output shaft via a reduction gear mechanism.

6. The electric power steering device according to claim 4, wherein the filter having the signal smooth characteristic and the filter having the high-frequency emphasis characteristic are set to be paired characteristics.

7. The electric power steering device according to claim 6, wherein the electric motor is coupled with the output shaft via a reduction gear mechanism.

8. The electric power steering device according to claim 1, wherein the electric motor is coupled with the output shaft via a reduction gear mechanism.

* * * * *